United States Patent
Bross et al.

(10) Patent No.: US 11,520,623 B2
(45) Date of Patent: Dec. 6, 2022

(54) COMMUNICATION WITH MOTOR VEHICLES

(71) Applicant: Bayerische Motoren Werke Aktiengesellschaft, Munich (DE)

(72) Inventors: Marco Bross, Karlsfeld (DE); Georg Maier, Unterschleissheim (DE); Thoralf Reis, Munich (DE); Henry Thasler, Mering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 449 days.

(21) Appl. No.: 16/781,006

(22) Filed: Feb. 4, 2020

(65) Prior Publication Data

US 2020/0174835 A1    Jun. 4, 2020

Related U.S. Application Data

(63) Continuation of application No. PCT/EP2018/071136, filed on Aug. 3, 2018.

(30) Foreign Application Priority Data

Sep. 29, 2017   (DE) .................... 10 2017 217 400.5

(51) Int. Cl.
  *H04W 4/38* (2018.01)
  *G06F 9/48* (2006.01)
  *H04W 4/46* (2018.01)

(52) U.S. Cl.
  CPC ............ *G06F 9/4881* (2013.01); *H04W 4/38* (2018.02); *H04W 4/46* (2018.02)

(58) Field of Classification Search
  CPC ......... G06F 9/4881; H04W 4/38; H04W 4/46; G07C 5/008; G07C 5/0841;
  (Continued)

(56) References Cited

U.S. PATENT DOCUMENTS

| 10,424,128 B2 | 9/2019 | Oberschachtsiek et al. |
| 2005/0065711 A1 | 3/2005 | Dahlgren et al. |

(Continued)

FOREIGN PATENT DOCUMENTS

| CN | 102682495 A | 9/2012 |
| CN | 104050805 A | 9/2014 |

(Continued)

OTHER PUBLICATIONS

English translation of a Chinese Office Action issued in Chinese Application No. 201880041308.7 dated Mar. 2, 2022 (five (5) pages).

(Continued)

*Primary Examiner* — Ronald Eisner
(74) *Attorney, Agent, or Firm* — Crowell & Moring LLP

(57) ABSTRACT

Vehicle data are collected in a method in which one or more motor vehicles suitable for road traffic are assigned tasks, wherein the method involves: transmitting first information from a first of these motor vehicles to a backend that can communicate with multiple instances of these motor vehicles; and the backend taking this first information as a basis for assigning a first of these tasks to the first motor vehicle; wherein performing the first task includes transmitting second information; and wherein the first information is transmitted from the first motor vehicle to the backend via a mobile radio link, and/or the first task is assigned via a mobile radio link.

17 Claims, 2 Drawing Sheets

(58) Field of Classification Search
CPC ....... G08G 1/096741; G08G 1/096775; G08G 1/0112; H04L 67/52; H04L 67/125
See application file for complete search history.

(56) References Cited

U.S. PATENT DOCUMENTS

| | | | |
|---|---|---|---|
| 2008/0208393 | A1 | 8/2008 | Schricker |
| 2012/0215446 | A1 | 8/2012 | Schunder et al. |
| 2013/0311003 | A1* | 11/2013 | Abo El-Fotouh ....... G06F 17/00 701/2 |
| 2014/0266795 | A1 | 9/2014 | Tseng et al. |
| 2015/0207859 | A1 | 7/2015 | Lu et al. |
| 2016/0171894 | A1 | 6/2016 | Harvey |
| 2017/0091481 | A1* | 3/2017 | Chan ....................... H04L 63/04 |
| 2018/0060988 | A1* | 3/2018 | Klenk .............. G06Q 10/06311 |
| 2018/0308191 | A1* | 10/2018 | Matthiesen ........ G01C 21/3438 |

FOREIGN PATENT DOCUMENTS

| | | |
|---|---|---|
| CN | 104796454 A | 7/2015 |
| CN | 105868021 A | 8/2016 |
| DE | 101 31 839 A1 | 1/2003 |
| DE | 10 2011 106 295 A1 | 1/2012 |
| DE | 10 2012 006 068 A1 | 9/2013 |
| DE | 10 2015 008 720 A1 | 1/2017 |
| EP | 3 157 276 A1 | 4/2017 |

OTHER PUBLICATIONS

Chinese-language Office Action issued in Chinese Application No. 201880041308.7 dated Oct. 9, 2021 with English translation (19 pages).

International Search Report (PCT/ISA/210) issued in PCT Application No. PCT/EP2018/071136 dated Sep. 28, 2018 with English translation (five pages).

German-language Written Opinion (PCT/ISA/237) issued in PCT Application No. PCT/EP2018/071136 dated Sep. 28, 2018 (seven pages).

German-language Search Report issued in counterpart German Application No. 10 2017 217 400.5 dated Feb. 18, 2019 with partial English translation (12 pages).

\* cited by examiner

COMMUNICATION WITH MOTOR VEHICLES

CROSS REFERENCE TO RELATED APPLICATIONS

This application is a continuation of PCT International Application No. PCT/EP2018/071136, filed Aug. 3, 2018, which claims priority under 35 U.S.C. § 119 from German Patent Application No. 10 2017 217 400.5, filed Sep. 29, 2017, the entire disclosures of which are herein expressly incorporated by reference.

BACKGROUND AND SUMMARY OF THE INVENTION

The present invention relates to a method for communicating with motor vehicles. The invention relates, in particular, to the communication between a backend system (or "backend" for short) and one or more motor vehicles, in particular using the mobile radio network. The invention also extends to a suitable motor vehicle and a suitable backend. The invention also comprises a system which has a backend of this type and one or more motor vehicles of this type.

In connection with the present invention, the term "backend" means, in particular, a device, typically a substantially stationary device (that is to say not mobile, unlike a vehicle). Such a backend may have a central processing unit, for example a computer system operated by a company, wherein such a company may be, for example, a vehicle manufacturer, a service company or the like.

Exemplary embodiments of the present invention can be used to collect vehicle data, for example. Within the scope of the present invention, the data captured in a vehicle by the sensor system installed in the latter, inter alia, are referred to as vehicle data. In this case, the sensor system can capture inputs from the vehicle environment (for example objects in the vehicle environment which are captured by a camera), inputs from the driver (for example actuation of an adjusting lever) and inputs from the technology installed in a vehicle (for example degree of opening of the throttle valve). The data can be transmitted to a central processing unit (backend) by means of an air interface and via a mobile radio path.

Systems which are already known for collecting vehicle data are statically implemented in the vehicle for dedicated applications (for example updating of traffic flow information of a map). The inventors of the present invention have recognized that these systems transmit vehicle data even when there is no need (for example: the necessary information has already been reported by a sufficiently large quantity of vehicles or a specific item of information is not of interest in a particular geographical region) and, as a result, require resources on the control devices of a vehicle and generate costs for transmitting and processing the data. In addition, the inventors have recognized that systems for collecting vehicle data which have been implemented statically—that is to say in native software—can be updated only to a very limited extent on account of extensive interactions with further systems in the vehicle. The problems which possibly result therefrom are considered in more detail below:

1) Need for resources on the control devices of a vehicle
In this context, the following topics, in particular, are combined under resources: processor computing time, persistent storage space, main memory usage and bandwidth used on communication media and buses. If a system for collecting vehicle data is permanently partitioned on one or more control devices, fewer resources are available for other applications (functional reduction) or the resource budget of the control devices is selected to be too large (unnecessary costs).

2) Costs of transmitting the vehicle data
When transmitting vehicle data on the path from the vehicle to a central processing unit (backend), it is possible to pass through sections for which use-dependent costs arise. For example, the mobile radio network used in all mobile radio transmissions is operated by a mobile radio provider that typically determines the costs on the basis of the transmitted volume of data. If unnecessarily many or redundant data items are transmitted, the volume of data and therefore the costs incurred increase without this resulting in added value.

3) Costs of processing the vehicle data
The processing of vehicle data requires—just like their collection in the vehicle—resources such as processor computing time, persistent storage space, main memory usage and bandwidth used on communication media. The costs of this processing generally increase monotonously with the volume of data.

4) Restricted ability to update native systems
If the software which transmits data is natively implemented, this does not allow the amount and the transmission times to be adapted or changed within short periods (for example 1-3 months) in order to exclude interaction with other systems.

Against this background, the object of the present invention is to ensure efficient communication between a backend and one or more motor vehicles and/or to better take into account the utilization of one or more motor vehicles during such communication, for example for the purpose of collecting vehicle data.

The invention provides a method, a motor vehicle, a backend and a system according to the independent claims. Advantageous developments emerge from the dependent claims.

According to one embodiment, the invention relates to a method for allocating tasks (for example collecting and transmitting vehicle data) to one or more motor vehicles suitable for road traffic. The method comprises transmitting a first item of information from a first of these motor vehicles to a backend which can communicate with a plurality of these motor vehicles. With this first information, the first motor vehicle can inform the backend that the first motor vehicle is available for performing tasks. As explained in more detail below, the first information may have, for example, details of vehicle properties, the position of the motor vehicle or the utilization of the motor vehicle. On the basis of this first information, the backend allocates a first of these tasks to the first motor vehicle. In this step, the backend can therefore decide which task(s) is/are allocated to the first motor vehicle. As a result of the fact that this takes place on the basis of the first information, nonsensical or unnecessary allocation of tasks can be avoided. The performance of the first task comprises transmitting a second item of information. Vehicle data which have been collected by the motor vehicle according to the allocated task come into consideration as such an item of second information, in particular. The first information is transmitted from the first motor vehicle to the backend via a mobile radio path and/or the first task is allocated via a mobile radio path. This embodiment therefore differs from some known methods in which the motor vehicle can communicate with systems outside the vehicle only during a workshop visit or the like in order to receive (new) tasks.

According to one exemplary embodiment, the method comprises the step of transmitting the second information via a mobile radio path. Therefore, the collected vehicle data can also be transmitted without a workshop visit being required for this.

The performance of the first task can comprise transmitting the second information to the backend or to a unit associated with the backend, although it would also be possible, as an alternative, to transmit the second information to another, independent unit.

According to one exemplary embodiment, the first motor vehicle is equipped to transmit the first information to the backend and/or to receive an allocation of the first task from the backend and/or to possibly transmit the second information, while the first motor vehicle is in road traffic. Tasks can therefore be allocated in real time and vehicle data can be transmitted as quickly as possible.

The second information may have data relating to the first motor vehicle, in particular its state. For example, a vehicle manufacturer may be informed of the state of motor vehicles, which can contribute to the improved further development of vehicle models, for example.

Additionally or alternatively, the second information may have data relating to an environment of the first motor vehicle. For example, traffic sign data or data relating to the volume of traffic or weather conditions can thus be collected and transmitted.

According to one exemplary embodiment, the backend allocates the first task to the first motor vehicle only when the backend expects, on the basis of the first information, that the first motor vehicle can perform the first task. Unnecessary data transmission and processing can thus be avoided.

For example, the backend can expect that the first motor vehicle can perform the first task if the backend determines, on the basis of the first information, that the first motor vehicle satisfies technical prerequisites needed to perform the first task. For example, a technical prerequisite for performing a task which comprises collecting traffic sign data is that the first motor vehicle is equipped with at least one camera. The first information preferably has technical data relating to the first motor vehicle, with the result that the backend is informed of the technical equipment (for example the installation of cameras) of the first motor vehicle on the basis of the first information. On the basis of this information, the backend can determine whether the technical prerequisites corresponding to the first task have been satisfied.

Additionally or alternatively, the backend can expect that the first motor vehicle can perform the first task if the backend determines, on the basis of the first information, that the first motor vehicle is in or close to a geographical area or approaches this geographical area in which it must be situated in order to be able to perform the first task. For example, a task may be restricted to a particular geographical area—for example the collection of traffic sign data in a particular town. For example, the first information provides information on where the first motor vehicle is situated, with the result that the backend can determine whether the first motor vehicle is possible for the first task from a geographical point of view.

According to one exemplary embodiment, the backend is informed of utilization of the first motor vehicle by means of the first information. It is therefore possible to avoid the situation in which the first motor vehicle is "overloaded" because, in a case of the load, it cannot perform the first task or can perform the first task only with a delay.

According to one exemplary embodiment, the backend compares the first information with a corresponding item of information transmitted by a second of these motor vehicles to the backend and decides, on the basis of this comparison, which of the motor vehicles the first task is allocated to. Better or more uniform utilization of the motor vehicles can thus be ensured, for example. In this context, there may well be a difference between better and more uniform utilization of the motor vehicles. More uniform utilization could ensure, for example, that tasks are preferably allocated to those motor vehicles whose utilization is lower than the utilization of other motor vehicles. In contrast, better utilization could (also) take into account other factors even if (somewhat) more uneven utilization arises as a result. For example, a task could be allocated to a motor vehicle A, even though a motor vehicle B has lower utilization, if the motor vehicle A is better suited to performing the task than the motor vehicle B from a technical point of view, for example. Better suitability from a technical point of view could involve, for example, higher-quality sensors being installed in the motor vehicle A than in the motor vehicle B, as a result of which the data determined by these sensors in the motor vehicle A are also more accurate than in the motor vehicle B.

According to one exemplary embodiment, the first motor vehicle takes into account a data protection setting applicable to the first motor vehicle when transmitting the first information. For example, it may be the case that a driver of the first motor vehicle has input, to the first motor vehicle, particular data protection settings which restrict the availability of the first motor vehicle for particular data collection tasks, for example via a user interface. The driver can specify, for example, that the first motor vehicle can be used to transmit (second) information which is possibly used to improve the safety of vehicles, but not that information from which the location of the first motor vehicle can be determined.

Provision is also made, in the interests of data protection, for the first and/or second information to respectively have first and second portions, wherein the first portion is personal or personalized and the second portion is not personal and is not personalized. The personal or personalized portion is typically needed to enable communication via the mobile radio network. However, the first and second portions are separated from one another over the course of the method. The second portion is used further and the first portion is not used further. This separation of the first and second portions preferably takes place in the backend. It can therefore be ensured that data protection provisions can be taken into account, in which case the first motor vehicle can nevertheless contribute to performing tasks.

According to one exemplary embodiment, one or more priorities are allocated to the task(s), preferably by the backend, for example a performance and/or transmission priority. This priority or these priorities can influence the order in which the tasks are performed and/or the order in which the second information is transmitted.

According to one embodiment, the invention also relates to a motor vehicle which can be used in the method described above. The motor vehicle has means for transmitting a first item of information to a backend via a mobile radio path, in particular a mobile radio device (transceiver), with which the motor vehicle can gain access to the mobile radio network, and an associated data processing device which stores the first information or requests it inside the vehicle and forwards it to the mobile radio device. The motor vehicle also has means for receiving a first task from the backend via a mobile radio path. These means can in turn have a mobile radio device (transceiver), wherein the means for transmitting the first information and the means for receiving the first task can at least partially overlap. That is to say, the (same) transceiver can definitely be used to transmit the first information and to receive the first task. The motor vehicle also has means for performing the first task, wherein the performance of the first task comprises transmitting a second item of formation. The second information can in turn be transmitted via a mobile radio device (transceiver), for example via the same transceiver which is used to receive the first task and/or to transmit the second information.

According to another embodiment, the invention relates to a backend which is equipped to allocate tasks to one or more motor vehicles suitable for road traffic. The backend has means for receiving a first item of information from a first of these motor vehicles with which the backend can communicate. The backend also has means for allocating, on the basis of this first information, a first of these tasks to the first motor vehicle, wherein performance of the first task by the first motor vehicle comprises transmitting a second item of information by the first motor vehicle. The first information is transmitted from the first motor vehicle to the backend via a mobile radio path and/or the first task is allocated via a mobile radio path. The means for receiving and allocating may in turn have a mobile radio device (transceiver), wherein the same transceiver can be used for receiving and allocating.

According to another embodiment, the invention relates to a system having at least one motor vehicle as described above and a backend as described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
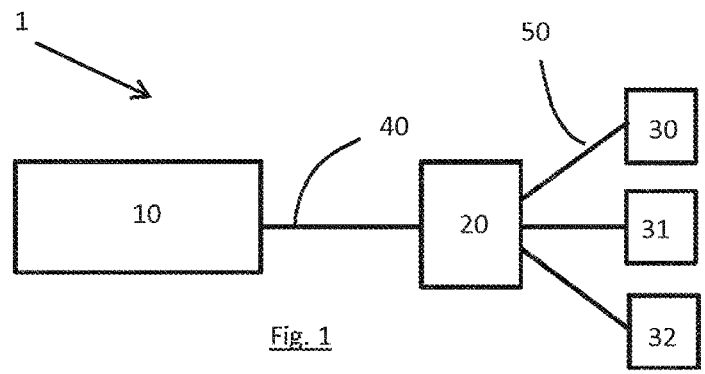
FIG. 1 schematically shows a system for communicating with motor vehicles according to one embodiment of the present invention.

The system 1 illustrated in FIG. 1 for communicating with motor vehicles has a backend 10 which is connected to a plurality of vehicles 30, 31, 32 via a mobile radio network 20. In the interests of clarity, the mobile radio network is representatively provided with the reference sign 20 in FIG. 1, in which case a mobile radio path 50 is illustrated between the mobile radio network 20 and a first motor vehicle 30, even though the mobile radio path 50 can actually be considered to be part of the mobile radio network 20. The connection 40 between the backend 10 and the mobile radio network 20 may be, for example, a connection via cable or a further mobile radio path.

Figure 2:
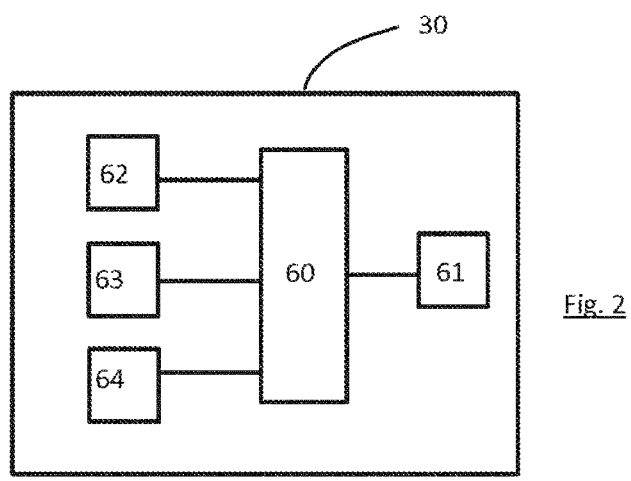
FIG. 2 shows an exemplary schematic illustration of a motor vehicle according to one embodiment of the present invention.

FIG. 2 illustrates the communication devices of a first motor vehicle 30 which are relevant to the exemplary embodiment according to the invention. These include, in particular, a data processing unit 60 which is connected to an air interface 61. The motor vehicle 30 can communicate with the mobile radio network 20 via the air interface 61. The data processing unit 60 is also connected to one or more entities 62, 63, 64. These entities can be functionally separated and can collect different types of vehicle data. A first entity 32 may have, for example, a camera which is installed on the motor vehicle 30 and can be used to collect traffic sign data. A second entity 63 may have, for example, a measuring device which can be used to determine the engine speed of the motor vehicle 30. The entities 62, 63, 64 can forward the determined vehicle data to the data processing unit 60, where these vehicle data can be preprocessed, if appropriate, before they are transmitted via the air interface 61 through the mobile radio network 20.

Using a (central) data processing unit 60 provides a standard framework for collecting vehicle data. In comparison with some approaches which are already known, this has the advantage that not every entity involved in collecting vehicle data must set up a separate connection to the mobile radio network 20.

The structure according to the exemplary embodiment illustrated in FIG. 2 also makes it possible to receive executable scripts via the air interface 61 by means of the data processing unit 60. As a result, the collection of vehicle data can be adapted to current requirements.

Figure 3:
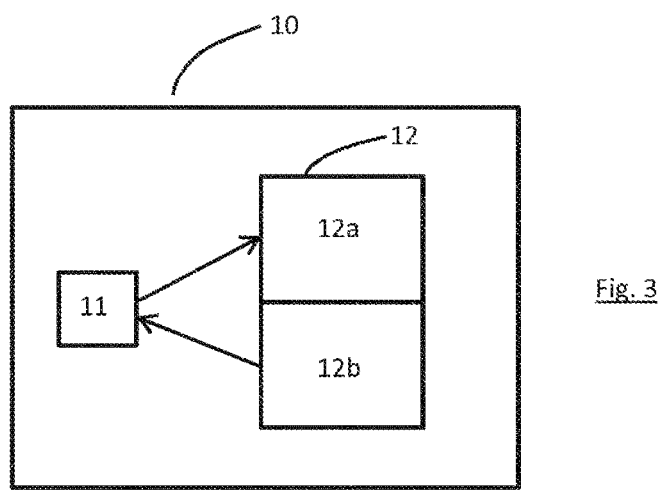
FIG. 3 shows an exemplary schematic illustration of a backend according to one embodiment of the present invention.

FIG. 3 illustrates the communication devices of a backend 10 which are relevant to the exemplary embodiment according to the invention. These include, in particular, a data processing unit 12 which is connected to a communication interface 11. The backend 10 can communicate with the mobile radio network 20 via the communication interface 11. The communication interface 11 may be a connection for a cable or an air interface, depending on whether the backend 10 is connected to the mobile radio network 20 by cable or a mobile radio path.

The data processing unit 12 can be functionally and/or structurally subdivided into two (or more) sections 12a and 12b.

A first section 12a can be responsible, for example, for receiving data from a motor vehicle 30 via the mobile radio network 20 and the communication interface 11 and for processing said data. Such data include, on the one hand, information (here also "a first item of information") which can be used by a motor vehicle 30 to "register" with the backend 10. Such a first item of information may have, for example, technical data or a position indication of the motor vehicle 30. On the other hand, such data also include that information (here also "a second item of information") which has the vehicle data which are or may be of interest when collecting vehicle data according to exemplary embodiments of the present invention.

A second section 12b may be responsible, for example, for allocating tasks to the motor vehicle 30 via the communication interface 11 and the mobile radio network 20.

As will be clear to a person skilled in the art on the basis of the present description, the sections 12a and 12b may overlap, that is to say some or all of the tasks described in connection with the sections 12a and 12b may be performed by a single structural unit. It is likewise possible for the sections 12a and 12b to be structurally separate from one another, over relatively great distances under certain circumstances. This may be the case, for example, if, for example, a first company is responsible for allocating tasks to the motor vehicle 30, but the second information is received and processed further by a second company.

Figure 4:
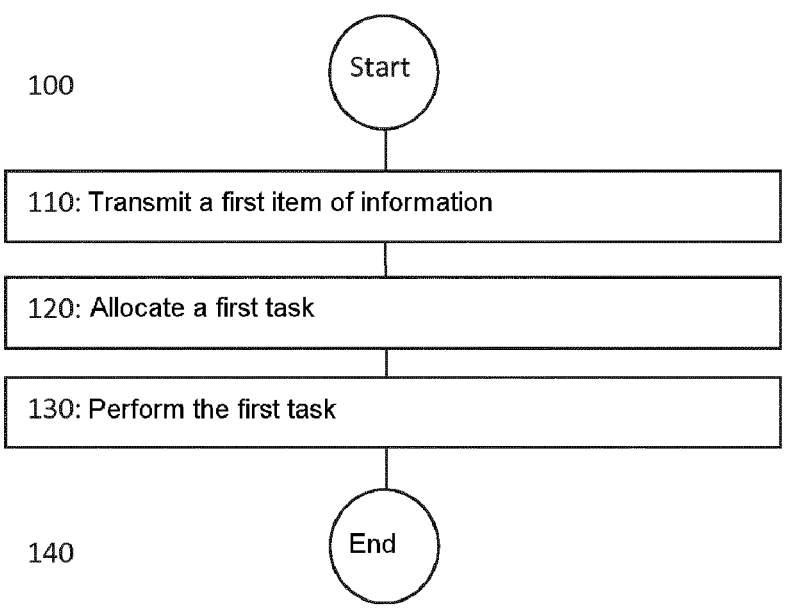
FIG. 4 shows a flowchart for a method for communicating with motor vehicles according to one embodiment of the present invention.

The flowchart illustrated in FIG. 4 illustrates, for example, a method according to the invention for collecting vehicle data. In a first method step 110, the motor vehicle 30, prompted by the data processing unit 60, transmits a first item of information to the backend 10 via the air interface 61 and the mobile radio network 20. By transmitting the first information, the motor vehicle 30 informs the backend 10 that the motor vehicle 30 is available for collecting vehicle data. This first method step 110 can be preceded by a further sub-step (not illustrated in FIG. 4) in which the data processing unit 60 of the motor vehicle 30 retrieves any data protection settings which could influence the transmission of the first information. The first information can have a corresponding reference to such a data protection setting.

In a second method step 120, the backend 10 receives the first information and allocates a first task to the motor vehicle 30 on the basis of this first information. This second method step can in turn be subdivided into a plurality of sub-steps (not illustrated in FIG. 4). The backend 10 first of all possibly checks a reference to data protection settings which is contained in the first information. On the basis of the first information, the backend 10 now determines the tasks for which the motor vehicle 30 could be suitable. For this purpose, the backend 10 can take into account the following details or information, inter alia:

the technical equipment of the motor vehicle 30 the position and/or direction of travel of the motor vehicle 30 the utilization (for example data processing capacity, tasks which have already been allocated) of the motor vehicle 30 whether other motor vehicles 31, 32 (for example on account of their technical equipment, position, direction of travel or utilization) are better suited to performing a particular task.

After checking the data protection settings and other details contained in the first information (in which case they could also be checked in the reverse order), the backend 10 allocates a first task to the first motor vehicle 30. This task is transmitted to the motor vehicle 30 via the communication interface 11 and the mobile radio network 20.

In a third method step 130, the motor vehicle 30 performs the first task. The performance of the first task comprises, inter alia, collecting vehicle data and transmitting them, as "second information", to the backend 10 via the air interface 61 and the mobile radio network 20. Depending on data protection rules, the backend 10 can process the second information in such a manner that a first portion, which is personal or personalized, is separated from a second portion, which is not personal and is not personalized, and is not used further. The second portion which has the vehicle data which are actually of interest can therefore be used to collect vehicle data taking into account data protection rules.

The method described here can be used while the motor vehicle 30 is in road traffic. This does not necessarily mean that the motor vehicle 30 must be situated and/or must move on a public road. The term "in road traffic" preferably means that the motor vehicle 30 is not in a workshop or in the immediate vicinity of a workshop. Accordingly, the method described here is definitely used while the motor vehicle 30 is on private property (for example residential property, garage, carport etc.) and/or is not moving.

Embodiments according to the invention make it possible to collect a suitable or even optimum amount of vehicle data using application-specific preprocessing which is suitable or even optimum at this time and therefore make it possible to indirectly reduce unnecessarily transmitted data and the associated costs.

The use of a standard framework for collecting vehicle data can also reduce the development cost. The collection of vehicle data can likewise be dynamically adapted to the requirement situation in a very short time.

Although a (partial) implementation based on executable scripts is more resource-intensive (with respect to RAM/CPU load), it also allows the required data to be transmitted to the customer as required after delivery of the vehicle. Increased flexibility and adaptation to requirements can thus be achieved according to some embodiments.

In contrast, according to some embodiments, it is possible to dispense with transmitting executable scripts from the backend to the vehicle. Such an implementation may provide for the vehicle to already be preprogrammed or prepared in another manner for performing particular (types of) tasks. It can then be sufficient to transmit particular parameters to the vehicle, which parameters can be used to switch an already existing function for performing a task on and off or to configure such a function.

Only one example of such "configuration by transmitting parameters" is described briefly at this point. A vehicle may be equipped, for example, with cameras or other sensors in order to detect traffic signs. The vehicle also has control systems and communication devices which—in interaction with the cameras/sensors—have already been preprogrammed to collect traffic sign data. In this prepared state, the vehicle can detect, in principle, all types of traffic signs and can transmit corresponding traffic sign data to a backend. However, if only a particular type of traffic sign (for example speed limits, no parking, pedestrian crossing etc.) is intended to be detected in this example, it suffices to inform the vehicle what type of traffic sign is of interest. This can be implemented, for example, by transmitting image information, which represents one or more examples of images of such traffic signs, to the vehicle. It is therefore possible to enable a vehicle to perform a task by transmitting data or parameters (in particular those which relate to a configuration of the vehicle or its control systems) without executable scripts having to be transmitted to the vehicle for this purpose. According to some exemplary embodiments, a certain degree of flexibility can therefore be achieved without a particularly high data transmission rate being required for this purpose.

Within the scope of the present invention, it is nevertheless also possible to allocate tasks partially by transmitting executable scripts to the vehicle and partially without the transmission of executable scripts. For example, transmission of executable scripts to the vehicle may be necessary for allocating some tasks, whereas the transmission of executable scripts can be dispensed with for other tasks.

In embodiments according to the invention, different transmission priorities can be allocated to different tasks and can be taken into account when transmitting the second information. It can therefore be ensured, in the case of mobile radio bottlenecks, that the importance or urgency of the tasks and of the corresponding vehicle data can influence the transmission order.

In a similar manner, different performance priorities can be allocated to different tasks and can be taken into account when performing the tasks. In this manner, it can be ensured that the importance or urgency of the tasks and of the corresponding vehicle data can influence the performance order. This is advantageous, for example, when a vehicle does not have sufficient resources to perform all tasks allocated to this vehicle in a timely manner (for example owing to storage space use or CPU load).

The performance and transmission priorities need not necessarily be allocated separately. Instead, they may be combined to form an overall priority which can influence the order in which the tasks are performed and the second information is transmitted.

A vehicle can also "discard", that is to say fail to perform, one or more tasks even though the task(s) has/have been allocated to the vehicle. This may again occur owing to a lack of sufficient resources (bandwidth, CPU load, storage space etc.). The decision regarding which task(s) is/are discarded can also be made on the basis of the allocated priority/priorities.

In addition, it is possible to define a maximum "lifetime" of the data (for example when allocating a task and/or when transmitting the second information). This lifetime determines how long an item of information is valid (for example, local hazard warnings can be considered to no longer be valid already after a few minutes, whereas accident data, for example, may be valid for several months).

Whereas at least one exemplary embodiment has been described above, it should be noted that a large number of variations exist. In this case, it should also be noted that the exemplary embodiments described are only non-limiting examples, and the intention is not to thereby restrict the scope, the applicability or the configuration of the devices and methods described here. Rather, the description above will provide a person skilled in the art with an instruction for implementing at least one exemplary embodiment, but it goes without saying that various changes in the method of operation and in the arrangement of the elements described in an exemplary embodiment can be made without departing from the subject matter respectively defined in the attached claims and its legal equivalents. Each feature disclosed in the application text or in the drawings can be considered, individually or in combination with other features disclosed in the application text or in the drawings, to be the subject matter of the invention.

LIST OF REFERENCE SIGNS

1 Communication system
10 Backend
11 Communication interface of the backend 10
12 Data processing unit of the backend 10
12a, b Sections of the data processing unit 12
20 Mobile radio network
30, 31, 32 Motor vehicles
40, 50 Mobile radio paths
60 Data processing unit of the motor vehicle 30
61 Air interface of the motor vehicle 30
62, 63, 64 Entities (for collecting vehicle data)

What is claimed is:

1. A method for allocating tasks to one or more motor vehicles suitable for road traffic, the method comprising:
   transmitting a first item of information from a first motor vehicle of the motor vehicles to a backend which communicates with a plurality of the motor vehicles; and
   based on the first item of information, allocating a task to the first motor vehicle by way of the backend; wherein allocating the task is based on:
      comparing the first motor vehicle with a set of details comprising one or more of:
         technical equipment of the first motor vehicle;
         position and direction of travel of the first motor vehicle;
         data processing capacity of the first motor vehicle; and/or
         tasks already allocated to the first motor vehicle; and
      whether other motor vehicles are better suited to the task based on comparing one or more other motor vehicles with the set of details;
   performance of the task comprises transmitting a second item of information; and
      the first item of information is transmitted from the first motor vehicle to the backend via a mobile radio path and/or
      the task is allocated via a mobile radio path.

2. The method according to claim 1, wherein the method further comprises:
   transmitting the second item of information via a mobile radio path.

3. The method according to claim 2, wherein the performance of the task comprises:
   transmitting the second item of information to the backend or
   to a unit coordinate to the backend.

4. The method according to claim 1, wherein
the first motor vehicle is configured to:
   transmit the first item of information to the backend,
   receive an allocation of the task from the backend, and
   transmit the second item of information, while the first motor vehicle is in road traffic.

5. The method according to claim 1, wherein
the second item of information has data relating to the first motor vehicle.

6. The method according to claim 5, wherein
the data is a state of the first motor vehicle.

7. The method according to claim 6, wherein
the second item of information has data relating to an environment of the first motor vehicle.

8. The method according to claim 5, wherein
the second item of information has data relating to an environment of the first motor vehicle.

9. The method according to claim 1, wherein
the backend allocates the task to the first motor vehicle only when the backend expects, based on the first item of information, that the first motor vehicle can perform the task.

10. The method according to claim 9, wherein
the backend expects that the first motor vehicle can perform the task if the backend determines, on the basis of the first item of information, that the first motor vehicle satisfies technical prerequisites needed to perform the task; and
the backend expects that the first motor vehicle can perform the task if the backend determines, on the basis of the first item of information, that the first motor vehicle is in or close to a geographical area or approaches the geographical area in which it must be situated in order to be able to perform the task.

11. The method according to claim 1, wherein
the backend is informed of utilization of the first motor vehicle by the first item of information.

12. The method according to claim 1, wherein
the backend compares the first item of information with a corresponding item of information transmitted by a second of these motor vehicles to the backend and decides, based on the comparison, which of the motor vehicles the task is allocated to.

13. The method according to claim 1, wherein the first motor vehicle takes into account a data protection setting applicable to the first motor vehicle when transmitting the first item of information.

14. The method according to claim 1, wherein the first and/or second item of information respectively has first and second portions, wherein
the first portion is personal or personalized and the second portion is not personal and is not personalized, and
the first and second portions are separated from one another, and
the second portion is used further and the first portion is not used further.

15. A motor vehicle, comprising:
a mobile radio device configured to:
transmit a first item of information to a backend via a mobile radio path;
receive a task from the backend via a mobile radio path, wherein the task is allocated based on:
a comparison of the motor vehicle with a set of details comprising one or more of:
technical equipment of the motor vehicle, position and direction of travel of the motor vehicle, data processing capacity of the motor vehicle, and/or tasks already allocated to the motor vehicle; and
whether other motor vehicles are better suited to the task based on a comparison of one or more other motor vehicles with the set of details; and
perform the task, wherein the performance of the task comprises transmitting a second item of information.

16. A backend which is equipped to allocate tasks to one or more motor vehicles suitable for road traffic, wherein the backend comprises:
a data processor configured to:
receive a first item of information from a first motor vehicle with which the backend can communicate;
allocate, based on the first item of information, a task of to the first motor vehicle, wherein
performance of the task by the first motor vehicle comprises transmitting a second item of information by the first motor vehicle, wherein the task is allocated based on:
a comparison of the first motor vehicle with a set of details comprising one or more of:
technical equipment of the first motor vehicle, position and direction of travel of the first motor vehicle, data processing capacity of the first motor vehicle, and/or tasks already allocated to the first motor vehicle; and
whether other motor vehicles are better suited to the task based on a comparison of one or more other motor vehicles with the set of details;
and
the first item of information is transmitted from the first motor vehicle to the backend via a mobile radio path and/or the task is allocated via a mobile radio path.

17. A system comprising:
at least one motor vehicle;
at least one backend; wherein
the motor vehicle comprises:
a mobile radio device configured to:
transmit a first item of information to the backend via a mobile radio path;
receive a task from the backend via a mobile radio path; and
perform the task, wherein the performance of the task comprises transmitting a second item of information, wherein
the backend comprises:
a data processor configured to:
receive the first item of information from the motor vehicle with which the backend can communicate; and
allocate, based on the first item of information, the task to the motor vehicle, wherein
the task is allocated based on:
a comparison of the motor vehicle with a set of details comprising one or more of:
technical equipment of the motor vehicle, position and direction of travel of the motor vehicle, data processing capacity of the motor vehicle, and/or tasks already allocated to the motor vehicle; and
whether other motor vehicles are better suited to the task based on a comparison of one or more other motor vehicles with the set of details.

* * * * *